May 31, 1960  J. D. NELSON  2,938,822
HIGH BOND STRENGTH LAMINATE PRODUCT
Filed May 26, 1955
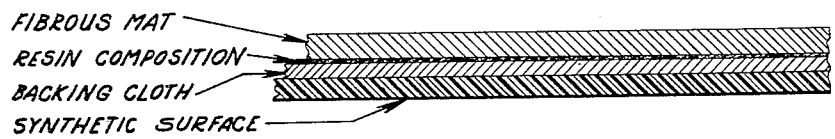
Inventor
John D. Nelson
by Joseph T. Cohen
His Attorney

United States Patent Office 2,938,822
Patented May 31, 1960

2,938,822
HIGH BOND STRENGTH LAMINATE PRODUCT

John D. Nelson, Pittsfield, Mass., assignor to General Electric Company, a corporation of New York Filed May 26, 1955, Ser. No. 511,395

6 Claims. (Cl. 154—137)

This invention relates to resinous compositions, and more particularly to resin varnishes consisting of a phenolic resin and zein useful in the bonding of fibrous materials, and to fibrous articles bonded therewith.

In the fabrication of certain articles of manufacture having in part a fibrous structure, for example, the padding employed in upholstered articles, which articles comprise a synthetic surface, it is the usual practice first to coat the fibrous mat material with a resinous varnish. The coated mat is dried to a tack-free condition and the dried mat is then bonded to the cloth side of the synthetic covering by suitable means. While phenolic resins are generally useful as the bonding agent with fibrous mats, mats coated with the usual phenolic resins are unsatisfactory when it is desired to use a cloth-backed synthetic fabric such as a sheeted vinyl resin as the surface material in the fabrication of decorative panels, for example, the interior side of automobile doors and the like. These resins are unsatisfactory for several reasons, one of which is the tendency of the resin to bleed into the synthetic surface material during the curing operation. While shellac substitutes of the type described in Reynolds et al. Patent 2,591,466, assigned to the assignee of the present invention, contain zein among other ingredients, these compositions cannot be employed for the present purposes since they exhibit serious bleeding into the synthetic surfacings.

Unexpectedly, I now have found that liquid phenolic resins in general can be rendered highly satisfactory for the bonding of fibrous materials to synthetic surfacing materials if modified with zein, an extract obtained from gluten meal, in certain proportions hereinafter defined. More specifically, the phenolic compositions of this invention, composed of a phenolic resin, zein and a solvent, are eminently suitable for the bonding of fibrous materials to be used in fabricating articles having a synthetic surfacing or covering, of the type prepared from vinyl resins for example, because of their superior coating characteristics, fast-drying properties, and excellent bonding strength. These compositions are exceptionally suitable since they do not block the coated mats and their fast-bond cycle makes them eminently suitable for dielectric curing. Additionally, fibrous mats coated with these compositions have excellent storage life. A further advantage derived by using these compositions and perhaps the most important is in the absence of bleeding of the resin into the covering material. This last mentioned advantage is significant since it is probably the most serious shortcoming of the majority of the phenolic resins.

In the accompanying drawing, a laminated article prepared in accordance with my invention is illustrated in cross-section wherein a cloth backed synthetic surface of the type prepared from a sheeted vinyl resin is bonded to a fibrous mat with the aid of the zein modified phenolic composition which I have found to be suitable for the purposes described.

In accordance with this invention, I have found that compositions comprising a liquid phenolic resin and from about 15 to about 38%, by weight of the total solids in the composition, of zein, are highly advantageous in preparing bonded fibrous materials for the purposes previously described. While excellent results are obtained within the aforementioned range, I have found that a zein content of about 33.5% of total solids gives the optimum drying rate. Higher zein contents give faster curing varnishes but more critical manufacturing controls are required and shorter storage life and inferior bonding strengths result.

The phenolic resins employed in preparing the varnishes useful in this invention may be prepared by reacting a phenolic component containing at least 70% phenol with formaldehyde in the ratio of 1 mol of phenol to from about 1.1 to about 2.0 mol of formaldehyde in the presence of about 1 to 5%, by weight, of a base, such as sodium hydroxide, based on the phenolic reactants. In addition to phenol, the phenolic reactant may contain up to 35% cresol, and the use of from at least 30 to 35%, by weight of cresol is ordinarily preferred to obtain a material which is even smoother and faster-drying than are the compositions obtained when phenol is the only phenolic reactant. The phenolic reactants and formaldehyde are maintained at reaction temperatures under reflux and then dehydrated under vacuum to a temperature of 90° C. The resin is cut with a solvent, for example ethyl alcohol, to a solids content of 40 to 80%, with a preferred range being from about 68 to 72%. This product is generally a liquid material, the solids content referring to the amount of non-vaporizable or solidifiable material remaining after removal of the volatile components thereof, such as the water or alcohol. In preparing the phenolic resin-zein compositions, the weight of the liquid phenolic resin composition may range from about 86 to 125% by weight of the total solids content of the composition. Stated another way, the weight of the resin solids in the liquid phenolic resin may range from 62 to 85% by weight of the total solids content of the composition.

Specific examples of liquid, thermosetting phenolic resins, useful in the present invention, dehydrated to approximately 75 to 85% resin solids, are described in Alexander Patent 2,218,373, assigned to the assignee of the present invention. Examples of other thermosetting phenolic resins which can be employed in preparing the compositions of this invention include the neutralized liquid, alkaline-catalyzed products of partial reaction of:

Phenol and furfural
m-Cresol and formaldehyde
m-Cresol and furfural
3,5-xylenol and formaldehyde
3,5-xylenol and furfural
Phenol, formaldehyde and furfural
Phenol, m-cresol and furfural
Phenol, resorcinol and formaldehyde
Phenol, resorcinol and furfural
Phenol, formaldehyde and acetone
Phenol, formaldehyde and acetaldehyde
Phenol, phenyl phenol and formaldehyde
Phenol, alpha-phenylethyl phenol and formaldehyde
Phenol, m-cresol, formaldehyde and furfural In order that those skilled in the art may more readily understand this invention, the following examples are given by way of illustration and not by way of limitation. All parts and percentages are by weight.

Example 1

A liquid, phenolic resin was prepared by reacting 1950 parts of synthetic phenol, 975 parts of cresol, 3770 parts of 37.2% formaldehyde, 26 parts of sodium hydroxide and 146 parts of water. This mixture was refluxed, partially dehydrated and 950 parts of ethyl alcohol were added to the partially dehydrated product. The properties of the liquid resin thus prepared were as follows:

| | | |
|---|---|---|
| Solids content | percent | 68–72 |
| Viscosity | cp | 700–1200 |
| Cure | sec | 75–95 |

To 2410 parts of the liquid phenolic resin were added 833 parts of zein, 2411 parts of ethyl alcohol and 74 parts of water. This mixture was cold-blended to give a varnish typical of the varnishes of this invention having a solids content of 44–46%.

Cotton fibrous mats were prepared by coating with the foregoing varnish and thereafter drying in an oven. A sheeting comprising 1/16" thick plasticized polyvinyl chloride sheeting having a cloth backing was placed on top of one of the dried mats and the mat was bonded to the cloth side of the sheeting by subjecting the assemblage to pressure and the influence of a high frequency electric field in a press equipped with high frequency electric heating means. The bonding cycle was extremely fast, requiring only 10 to 15 seconds, resulting in a finished panel with no evidence of bleeding of the resinous binder into the sheeting material.

*Example 2*

A shellac substitute of the type described and claimed in the Reynolds et al. patent, previously acknowledged, was prepared, employing the liquid phenolic resin in alcohol prepared in the first part of Example 1, from the following ingredients:

| | Parts |
|---|---|
| Resin of Example 1 | 1550 |
| Zein | 1072 |
| Vinsol [1] | 84 |
| Ethyl alcohol | 2275 |

[1] The light petroleum hydrocarbon insoluble, aromatic hydrocarbon solvent soluble resinous extract of pinewood.

The zein content was 50% of the total solids or 21.5%, by weight of the entire mixture. The total solids content was 45%.

Mats were prepared in similar manner as in Example 1; however, it was difficult to obtain a uniform coating retaining reactivity for the subsequent bonding operation. Additionally, the storage life of the coated mats was inferior. Upon bonding to a cloth backed polyvinyl chloride sheet by the method of Example 1, bleeding of the resinous shellac substitute into the sheeting material was very bad, especially at the pressure points. Moreover, the bonded product had low strength due to inadequate resin flow.

*Example 3*

A varnish having a solids content of 55% was prepared without zein from the following formulation:

| | Parts |
|---|---|
| Synthetic phenol | 2500 |
| Formaldehyde (37.2%) | 2340 |
| Ammonia (29.4%) | 100 |
| Zinc stearate | 12.5 |
| Ethyl alcohol | 1720 |
| Toluol | 170 |

Fibrous mats were prepared as in Examples 1 and 2. While coating of the mats was accomplished with ease, the resin bled badly into the polyvinyl chloride sheet during the bonding operation.

While typical liquid phenolic resins have been illustrated in the examples, it will be apparent that any of the liquid phenolic resins previously described can be used to advantage. Similarly, other bonding techniques such as pressing between platens heated either by steam or by electric resistance heating can be employed, but these methods are slower than the preferred high frequency electric heating means.

Although a water-ethyl alcohol mixture has been specified as the solvent for the zein and phenolic resin, other solvents and solvent systems of the type described by Manley and Evans, Industrial and Engineering Chemistry, pages 1416–1417 (1941), pages 661–665 (1943), and pages 408–410 (1944), are feasible.

The synthetic surfacing materials which may be employed to prepare the laminated articles of this invention include plasticized polyvinyl chlorides, polyvinyl chloride-polyvinyl acetate copolymers, polyvinyl chloride-polyvinylidene chloride copolymers, polyvinyl acetals, polyvinyl alcohol and its copolymers, synthetic rubber fabrics, nylon, etc. In general, any synthetic decorative sheeting material having a cloth backing may be employed.

Among the fibrous materials which may be employed in the present invention may be included wood pulp fibers, cotton, flax, jute, kapok, silk or the like, or synthetic filaments of cellulosic compositions, such as a cellulose or regenerated cellulose. Also included are mineral fibers such as spun glass, asbestos, mineral wool and the like.

What I claim as new and desire to secure by Letters Patent of the United States is:

1. The method of preparing laminated articles comprising a fibrous body and a vinyl surfacing material having a cloth backing which comprises the steps of coating and impregnating a fibrous mat material with a resinous composition consisting of (1) from about 62 to 85%, by weight of the total solids content of the composition, of phenolic resin solids, said phenolic resin solids being in the form of a liquid phenolic resin composition containing from about 40 to about 80% solids by weight, said phenolic resin comprising the alkaline catalyzed reaction product of ingredients comprising a phenol and a molar excess of an aldehyde, (2) from about 15 to about 38%, by weight of the total solids content of the composition, of zein and (3) a solvent for the zein and phenolic resin, drying the coated mat and bonding said coated mat to the cloth side of said vinyl surfacing material by means of heat and pressure.

2. The method of preparing laminated articles comprising a fibrous body and a vinyl surfacing material having a cloth backing which comprises the steps of coating and impregnating a fibrous mat material with a resinous composition consisting of (1) from about 62 to 85%, by weight of the total solids content of the composition, of phenolic resin solids, said phenolic resin solids being in the form of a liquid phenolic resin composition containing from about 68 to about 72% solids by weight, said phenolic resin comprising the alkaline catalyzed reaction product of ingredients comprising a phenol and a molar excess of an aldehyde, (2) from about 15 to about 38%, by weight of the total solids content of the composition, of zein and (3) a solvent for the zein and phenolic resin, drying the coated mat and bonding said coated mat to the cloth side of said vinyl surfacing material by means of heat and pressure.

3. The method of preparing a laminated article comprising a fibrous body and a polyvinyl chloride surfacing having a cloth backing which comprises the steps of coating and impregnating a fibrous mat with a resinous composition consisting of (1) from 62 to 85%, by weight of the total solids content of the composition, of phenolic resin solids said phenolic resin solids being in the form of a liquid phenolic resin composition containing from about 68 to about 72% solids by weight, said phenolic resin comprising the alkaline catalyzed reaction product of ingredients comprising a phenol and a molar excess of an aldehyde, (2) about 33.5%, by weight of the total solids content of the composition of zein and (3) a solvent for the zein and phenolic resin, drying the coated mat and bonding said coated mat to the cloth side of said polyvinyl chloride surfacing material by means of a high frequency electric field and pressure.

4. A laminated article comprising a fibrous mat and a vinyl surfacing material having a cloth backing, said fibrous mat bonded to the cloth side of said vinyl surfacing material with a resinous composition consisting of (1) from about 62 to 85%, by weight of the total solids content of the composition, of phenolic resin solids, said phenolic resin solids being in the form of a liquid phenolic resin composition containing from about 40 to about 80% solids by weight, said phenolic resin comprising the alkaline catalyzed reaction product of ingredients comprising a phenol and a molar excess of an aldehyde, (2) from about 15 to about 38%, by weight of the total solids content of the composition, of zein and (3) a solvent for the zein and phenolic resin.

5. A laminated article comprising a fibrous mat and a vinyl surfacing material having a cloth backing, said fibrous mat bonded to the cloth side of said vinyl surfacing material with a resinous composition consisting of (1) from about 62 to 85%, by weight of the total solids content of the composition, of phenolic resin solids, said phenolic resin solids being in the form of a liquid phenolic resin composition containing from about 68 to about 72% solids by weight, said phenolic resin comprising the alkaline catalyzed reaction product of ingredients comprising a phenol and a molar excess of an aldehyde, (2) from about 15 to about 38%, by weight of the total solids content of the composition, of zein and (3) a solvent for the zein and phenolic resin.

6. A laminated article comprising a fibrous mat and a polyvinyl chloride surfacing having a cloth backing, said fibrous mat bonded to the cloth of said polyvinyl chloride surfacing with a resinous composition consisting of (1) from 62 to 85%, by weight of the total solids content of the composition, of phenolic resin solids, said phenolic resin solids being in the form of a liquid phenolic resin composition containing from about 68 to about 72% solids by weight, said phenolic resin comprising the alkaline catalyzed reaction product of ingredients comprising a phenol and a molar excess of an aldehyde, (2) about 33.5%, by weight of the total solids content of the composition of zein and (3) a solvent for the zein and phenolic resin.

References Cited in the file of this patent

UNITED STATES PATENTS

| | | |
|---|---|---|
| 2,562,641 | Saunders | July 31, 1951 |
| 2,578,709 | Lyijynen | Dec. 18, 1951 |
| 2,591,466 | Reynolds et al. | Apr. 1, 1952 |
| 2,591,771 | Bergey | Apr. 8, 1952 |
| 2,676,128 | Piccard | Apr. 20, 1954 |

FOREIGN PATENTS

| | | |
|---|---|---|
| 492,601 | Great Britain | Sept. 19, 1938 |
| 531,995 | Great Britain | Jan. 15, 1941 |
| 650,036 | Great Britain | Feb. 14, 1951 |
| 147,021 | Australia | June 25, 1952 |

OTHER REFERENCES

Vinylite Plastic, Bonding, Dec. 6, 1944, pages 6 and 7.